United States Patent [19]
Garza et al.

[11] 4,335,678
[45] Jun. 22, 1982

[54] SANITARY CATCHER AND SCOOPER

[76] Inventors: Philip A. Garza; Barbara A. Carter, both of 2062 N. Damen Ave., Chicago, Ill. 60647

[21] Appl. No.: 140,473

[22] Filed: Apr. 15, 1980

[51] Int. Cl.³ .................... A01K 23/00; A01K 29/00
[52] U.S. Cl. ............................................ 119/1; 294/55
[58] Field of Search ................ 119/1, 68, 153; 43/6, 43/12; 294/1 R, 19 R, 55

[56] References Cited
U.S. PATENT DOCUMENTS

| 1,430,847 | 10/1922 | Pennington | 119/153 |
| 2,653,403 | 9/1953 | Oslund | 43/6 X |
| 3,216,141 | 11/1965 | Walger | 43/6 |
| 3,786,780 | 1/1974 | Pezzino | 119/1 X |

FOREIGN PATENT DOCUMENTS 1521634 8/1978 United Kingdom .................. 43/12

Primary Examiner—Gene Mancene
Assistant Examiner—Robert P. Swiatek

[57] ABSTRACT

A sanitary adjustable catcher and scooper device for animal waste, particularly dogs', comprising: an elongated tubular handle member with a rest bar attached to diverging (V shaped) flexible rods, and a drawstring type disposable bag. A limited movement rod is affixed to a control bar, which is inserted on the flexible rods and controls the flexible rods for purposes of insertion, size, retaining, closing and disposal of drawstring type disposable bag. A scoop is detachably attached to the handle of the device and has a clip for retaining and/or releasing a disposable bag that covers the lower portion of scoop to prevent soiling. The scoop is used, in combination, with the device if scooping is needed.

2 Claims, 7 Drawing Figures

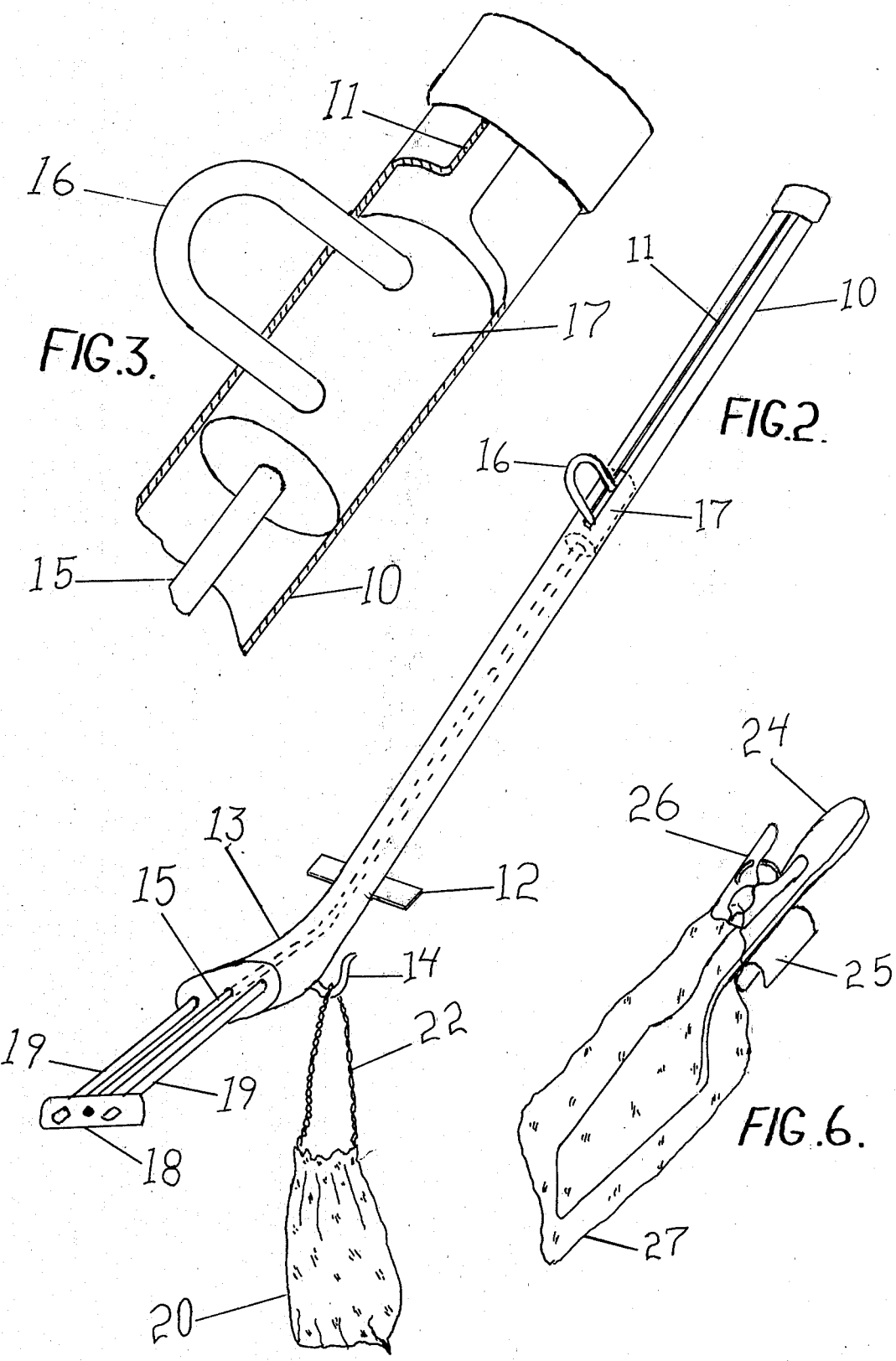

SANITARY CATCHER AND SCOOPER

SUMMARY OF THE INVENTION

The sanitary catcher and scooper comprises: an elongated tubular handle member attached at an angle to diverging (V shaped) flexible rods/holder means for a disposable drawstring type bag. The opening and closing of the flexible rods is controlled by a bar which is affixed to a rod which runs through the tubular handle to a slot at the upper end of said handle. The rod is affixed to a guide with a handle thereon for purposes of forward and rearward movement. The forward and rearward movement of the guide via the handle moves the control bar on the flexible rods, thereby opening and closing said flexible rods for the insertion, retaining, removal and disposal of the bag, without soiling the device or coming in contact with the fecal matter.

A detachable scoop is attached to the handle and has a means for retaining and/or releasing a small disposable bag which prevents soiling of the scoop. This is especially convenient for cleaning yards, etc., as it eliminates any cleaning of other implements that would necessarily be soiled.

The dual usage of the sanitary catcher and scooper allows for the most practical application possible and is a simple, sanitary method of solving a problem that has grown more serious each year.

In order that the invention may readily be carried into effect it will now be described with reference to the accompanying drawings wherein:

BRIEF DESCRIPTION OF THE DRAWINGS

FIG. 2 is a side view of the device with the guide handle in the forwardmost position in which the bag has been pushed off and is ready to be carried or disposed of.

FIG. 3 is a partly cutaway view, partly in section, on an enlarged scale of an embodiment of the rod and guide with the handle.

FIG. 6 is a side view of the scoop showing the clip means for releasably retaining a disposable bag to prevent soiling and a clip means on the underside of said scoop for attachment to the handle.

DESCRIPTION OF PREFERRED EMBODIMENTS

Figure 1:
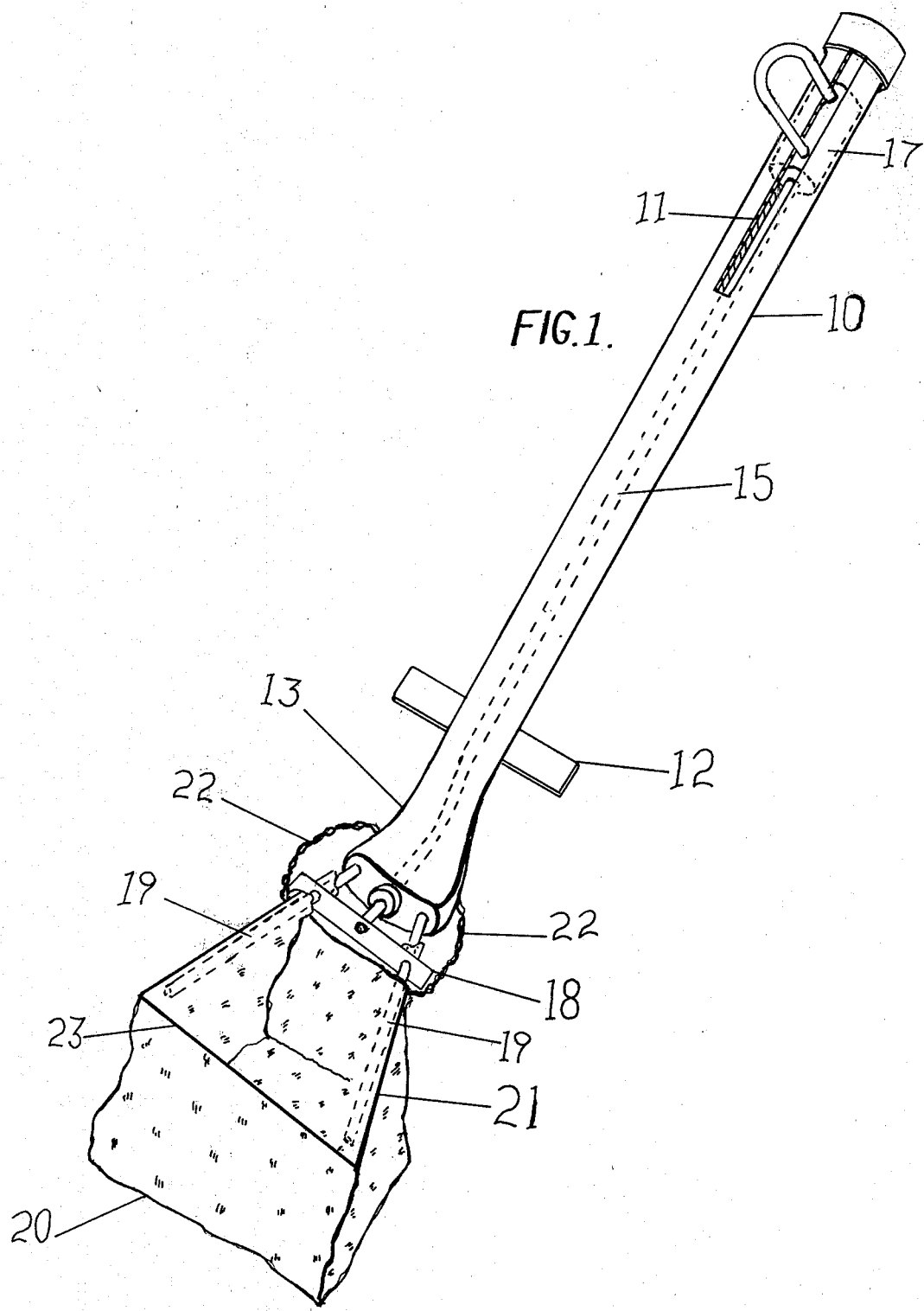
FIG. 1 is a frontal view of the device with the bag in open position.
Figure 4:
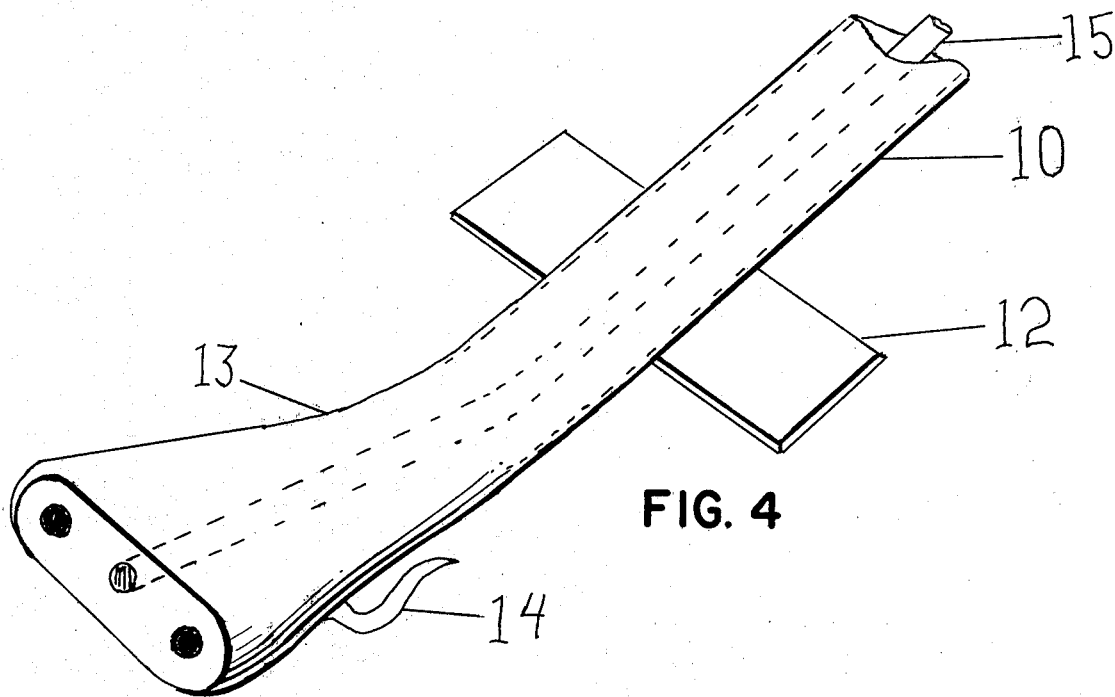
FIG. 4 is a section on an enlarged scale of the lower end of the handle showing the positions of the hook and rest bar.
Figure 7:
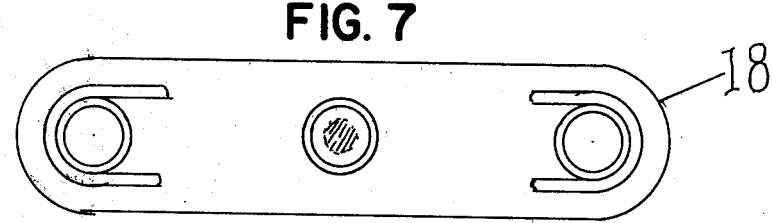
FIG. 7 is an enlarged front end view of the control bar and rods of FIG. 5.

Referring to FIG. 1 of the drawings, the sanitary catcher and scooper of the present invention comprises: an elongated tubular handle member 10 with a slot 11 at one end and a bend 13 at the opposite end, attached in a suitable manner, to diverging (V shaped) flexible rods 19, with a hook 14 (FIG. 4) at the juncture of the handle member 10 and the flexible rods 19.

Figure 5:
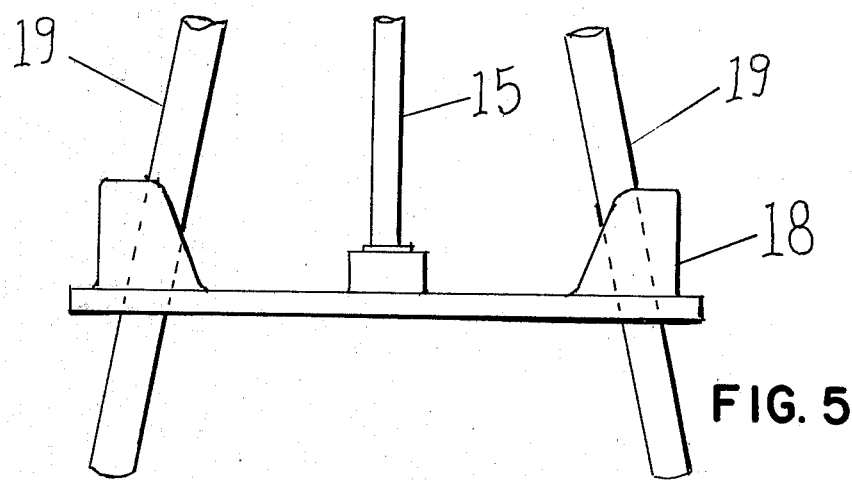
FIG. 5 is a section on an enlarged scale of a front view of the control bar inserted on flexible rods and showing the rod affixed to the center point thereof.

As shown in FIG. 5, the flexible rods 19 are inserted through a control bar 18 equidistant from the center point thereof and the lower end of a rod 15 is affixed to the center point of the control bar 18. As shown in FIG. 1, the rod 15 runs through the handle member 10 to the slot 11. As shown in FIG. 3, the rod 15 is affixed, in a suitable manner, to a guide 17 and a handle 16 is attached to the guide 17, in a suitable manner, thereby facilitating movement, through the guide 17, of the control bar 18.

Moving the handle 16 forward partially closes the flexible rods 19 allowing easy insertion of a drawstring type disposable bag 20. Moving the handle 16 to the forwardmost position will push the bag 20 off for disposal.

As shown in FIG. 1, the bag 20 is inserted on the flexible rods 19 through the drawstring casing 21 and the drawstring 22 is placed over the hook 14. The rearward movement of the control bar 18 via the handle 16 allows the flexible rods 19 to spread, forming a taut front edge 23 on bag 20, thereby holding the bag 20 in an open position and further retaining said bag 20.

The taut front edge 23 may be place on the ground and with the aid of a scoop 24 (FIG. 6) the device may be used for scooping. A detachable scoop 24 is attached by clip means 25, in a suitable manner, to the handle 10 and has a clip 26 for retaining or releasing a small disposable bag 27 to prevent soiling of the scoop 24.

The angle of the handle 10 to the flexible rods 19 allows the holder to stand comfortably as the device is suitably positioned when the dog excretes. The device can be used more than once if necessary.

As shown in FIG. 2, the bag 20 is disposed of by pushing the handle 16 to the forwardmost position until the bag 20 is pushed off the flexible rods 19; as the bag 20 falls, the drawstring 22 over the hook 14 closes the bag 20. The bag 20 can be carried in this manner if desired or disposed of by elevating the lower end of the device until the bag 20 slides off the hook 14. A rest bar 12 (FIG. 4) is positioned on the handle member 10 as a means of balancing the device when placed on a flat surface.

As can be seen from the foregoing description, the advantages and unique features of the present invention combine to produce a completely sanitary catcher and scooper of unsurpassed efficiency.

While the invention has been described by means of a specific example and a specific embodiment we do not wish to be limited thereto, for there are many variations which may be made by those skilled in the art without departing from the spirit of the invention. It is therefore intended that the scope of the invention be limited only to the claims which follow.

I claim:

1. A sanitary catcher and scooper device comprising: a tubular handle having a vertical slot at the upper end thereof, being attached on the opposite or lower end at an angle to diverging flexible rods, said flexible rods being a holder means for a drawstring type disposable bag, which is inserted on said flexible rods through the drawstring casing of said bag; a control bar having a pair of openings which is inserted on said flexible rods, and a rod thru said tubular handle attached at the lower end to the center point of said control bar, and affixed at the upper end to a guide, with a handle protruding thru the slot in said tubular handle, a hook near the juncture of said tubular handle and said flexible rods, over which the drawstring of said bag is looped, to close and retain said bag when pushed off said flexible rods, such that, by moving said handle forward through said slot of said tubular handle said control bar pushes said bag off said flexible rods, said drawstring remains over said hook, thereby closing and retaining said bag, so that by elevating the lower end of said tubular handle said bag will slide off said hook for disposal, thereby eliminating the necessity of handling said bag and maintaining the device in a sanitary condition.

2. The device as set forth in claim 1 wherein a detachable scoop is attached to the tubular handle by a clip means on the underside of said scoop and further having a clip on the upper side of said scoop to retain and/or release a disposible bag which covers the lower portion of said scoop to prevent soiling if used.

* * * * *